United States Patent [19]

Faison

[11] Patent Number: 5,533,794
[45] Date of Patent: Jul. 9, 1996

[54] HUB LOCK

[76] Inventor: James E. Faison, 1113 A Thicket Ct., Columbus, Ind. 47201

[21] Appl. No.: 264,902

[22] Filed: Jun. 24, 1994

[51] Int. Cl.6 .................................................. B60B 27/00
[52] U.S. Cl. .................... 301/105.1; 301/35.63; 411/115; 411/133
[58] Field of Search ................ 301/105.1, 111, 301/112, 117, 118, 114, 115, 120, 122, 124.1, 131, 35.53, 35.55, 35.58, 35.63; 411/114, 115, 129, 133, 140, 216, 217, 939, 948

[56] References Cited

U.S. PATENT DOCUMENTS

| | | |
|---|---|---|
| 299,969 | 6/1884 | Fahy . |
| 1,238,012 | 8/1917 | Hall ........................................ 411/115 |
| 2,202,080 | 5/1940 | Baker ................................ 301/35.55 X |
| 3,189,075 | 6/1965 | Jobe ........................................ 411/948 X |
| 3,464,474 | 9/1969 | Jansen ........................................ 411/216 |
| 4,944,562 | 7/1990 | Garrison . |

FOREIGN PATENT DOCUMENTS

| | | | |
|---|---|---|---|
| 72679 | 10/1916 | Austria .................................. 411/133 |
| 17591 | of 1912 | United Kingdom .................... 411/133 |

Primary Examiner—Russell D. Stormer
Attorney, Agent, or Firm—Kenneth F. Peacle

[57] ABSTRACT

A locking device for holding a hub bearing on a spindle. When locking the hub bearing into place, the wheel which sits on the hub and rotates around the spindle is also stabilized. The locking device replaces the traditional circular three-piece combination fastener predominately used in the commercial trucking industry. This locking device can be utilized as a replacement on spindles already on the highway, or it can be incorporated at the manufacture of the tractor or the trailer. And the present locking device can be utilized on any compatibly grooved spindle.

20 Claims, 1 Drawing Sheet

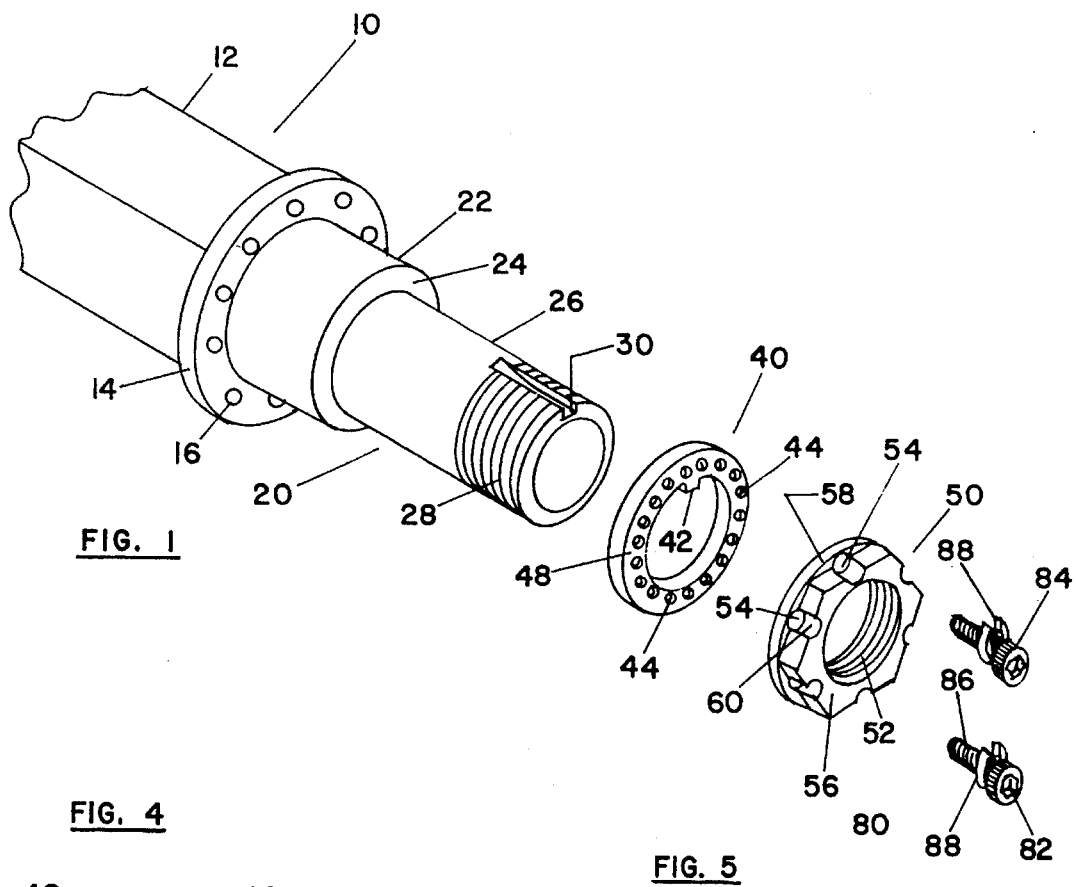
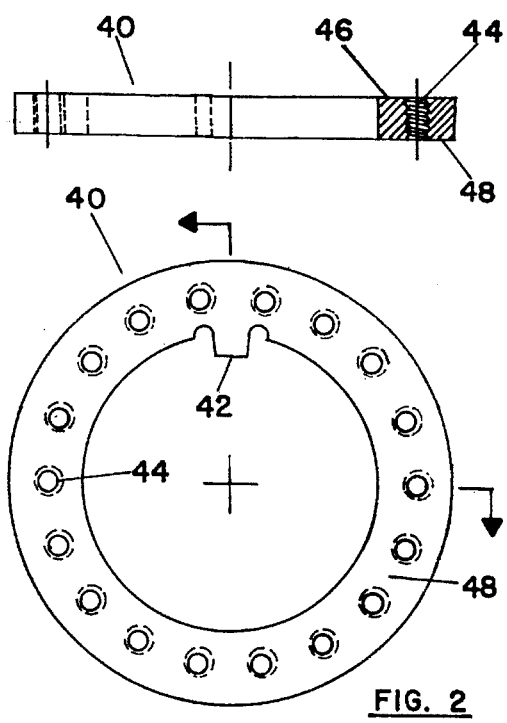

HUB LOCK

BACKGROUND OF THE INVENTION

1. Field of the Invention

The present invention is directed toward a locking device for the hub bearing riding on the type of spindle found commonly in the commercial trucking industry. By locking the hub bearing into place, the wheel which rests on the hub and rotates around the spindle is also stabilized. The present invention can be utilized as a replacement for the circular three-piece combination fastener currently in use on spindles already on the highway, or it can be incorporated during the manufacture of a new spindle-unit. Primarily, the locking device will be utilized by the commercial trucking industry, but it is also compatible with consumer driven commonly available four-wheel drive motor vehicle spindles. Moreover, the present locking device can be utilized for any compatibly grooved spindle.

2. Description of the Previous Art a) To the Applicant's knowledge, the circular three-piece combination fastener, such as the one associated with the presently manufactured Rockwell SQHP, SL/SQ-100/P single-reduction tandem axle, is not disclosed with specificity in any United States patent. However, to better understand the state-of-the-art relating to presently used commercial trucking industry spindles and fasteners, the circular three-piece combination fastener consists of an inner adjuster nut, a washer and an outer adjuster nut. The inner adjuster nut is provided with a dowel pin for engaging one of the sixteen holes provided on the keyed-washer with the combination fastener being completed by tightening the outer adjuster nut against the washer. Because of the design of this circular three-piece combination fastener, loading torque to the hub bearing according to a manufacturer's suggested specified pressure is both tedious and inconsistent. In the past, if the torque is too low, the oil seal can fail which causes the hub bearing to run loose while, if the torque is too high, the hub bearing can run hot which causes the wheel to lock-up. For whatever reason, when incorrect torque has been applied to the spindle-unit, the resultant risk of accident and death is magnified.

b) U.S. Pat. No. 299,969 (Fahy) discloses an axle-nut for a wooden wheel and axle combination. The 1884 Fahy invention is intended to prevent movement of the wheel back and forth endwise on the axle and keep the track of the wheel like that of a new wagon. Because of the era in which the Fahy axle-nut was patented, the Fahy design is only functional at the relatively slow velocities attributed to horse-driven vehicles—the common modes for transportation in the United States during the Nineteenth Century, e.g., buggies and covered wagons. Fahy also discloses the combination of a washer of the required thickness affixed rigidly to the nut by rivets, bolts or screws through corresponding openings. Additionally, the Fahy axle-nut is limited to use with an axle.

c) U.S. Pat. No. 4,944,562 (Garrison) specifically discloses a wire wheel hub adaptor. The device is a combination used in securing a wire spoked wheel with an internally locking hub. Moreover, the Garrison apparatus fits over an existing bearing cup while simultaneously extending outwardly from an attachable brake assembly wherein its annular flange is provided with counter-sunk bores corresponding to the preexisting stud pattern already extending from the brake assembly. Additionally, for its utilization, the apparatus further requires the combination of an axle shaft, spline shaft and a stub shaft, to name a few of the features of the wire wheel hub adaptor.

SUMMARY OF THE INVENTION

The present invention is a locking device for a hub bearing on a spindle. The apparatus is adaptable to compatibly grooved spindles that are found in the commercial trucking industry, such as, tractors and trailers, as well as, currently popular consumer driven four-wheel drive motor vehicles, or any other compatibly grooved spindle.

It is an object of the present invention to provide an improved locking device for a hub bearing relative to the traditional circular three-piece combination fastener currently in use on spindles commonly found in the above identified industries.

It is another object of the present invention to provide a locking device for a hub bearing for those motor vehicles already on the highway.

It is still another object of the present invention to provide a locking device for a hub bearing that can be incorporated during the manufacture of new motor vehicles.

Still another object of the present invention is to provide a locking device for a hub bearing which reduces the possibility of oil seal failure.

Yet still another object of the present invention is to provide a locking device for a hub bearing which reduces the possibility of the hub running loose, thereby improving operational safety.

It is yet another object of the present invention to provide a locking device for a hub bearing which reduces the possibility of the hub running hot, thereby improving operational safety.

Further still, yet another object of the present invention is to provide a locking device for a hub bearing manufactured from stainless steel or other durable metal or plastic which would extend the service-life of the present invention over that of the traditional circular three-piece combination fastener currently in use on spindles commonly found in the commercial trucking and four-wheel drive motor vehicle industries.

Prior to the present invention, it was virtually impossible to selectively and precisely adjust the tension applied to the hub bearing. Thus, in accordance with the present invention, any bolt can be safely torqued to 25 foot-pounds while the nut can be safely torqued to 125 foot-pounds. Therefore, by adjusting the bolts and the nut, the tension on the hub bearing can be precisely set at the standard which is recommended by the spindle-unit's manufacturer. It is believed that upon reading this disclosure, other advantages of the present invention shall become more apparent to those skilled in the art.

For the sake of simplicity, the present invention can be described as a locking device for holding a hub bearing on a spindle, comprising: a washer having a key for aligning with the keyway on the spindle and threaded apertures positioned about its circumference for receiving a bolt; and a nut having holes for aligning with the washer's threaded apertures for receiving a pair of bolts for fastening the washer and the nut. The novel and unique interaction of these simple elements creates the present hub lock.

For the purposes of this disclosure, "positioned circumferentially" shall mean that the element so described will be found "of or near the outer boundary of a circular perimeter and positioned at like radial distances from a common center with respect to the circular perimeter."

For the purposes of this disclosure, "hex-nut" shall mean a nut having a raised hexagonal face.

A description of the preferred embodiment follows. It is to be understood that this best mode description does not limit the scope of the present invention. The breadth of the present invention is identified in the claims appended hereto.

BRIEF DESCRIPTION OF THE DRAWINGS

FIG. 1 is an exploded view showing the spindle and how the present invention relates to the spindle.

FIG. 2 is a top view of the washer.

FIG. 3 is a top view of the nut.

FIG. 4 is a quarter-section cut-away of the washer.

FIG. 5 is a quarter-section cut-away of the nut.

DESCRIPTION OF THE PREFERRED EMBODIMENT

Although the disclosure hereof is detailed to enable those skilled in the art to practice the invention, the embodiment disclosed herein merely exemplifies the present invention which can be practiced in other specific structures.

Attention is directed to FIG. 1 which is an exploded view showing how the present locking device relates to the spindle-unit (10). Relative to the center of the motor vehicle, spindle-unit (10) extends outwardly from axle housing (12). As another point of reference, brake spider flange (14) is provided with openings (16) for interlocking with and supporting the brake drum (not shown). Further, spindle (20) of spindle-unit (10) extends outwardly and away from axle housing (12) and brake spider flange (14).

Looking at FIG. 1, spindle (20) includes shaft (26) and collar (22). The brake drum (not shown) is supported by collar (22) of spindle-unit (10). At the outward side of shaft (26) threads, (28) for interfacing with any compatible locking apparatus are provided. Importantly, shaft (26) is also provided with keyway (30) which runs tangentially through and is about the length of threads (28).

For reference and still with a view toward FIG. 1, neither the hub bearing or the wheel which turn about shaft (26) are shown so that the present invention's operation may be better demonstrated to those skilled in the art. However, if the hub bearing were shown, it would be positioned between rest (24) of collar (22) and threads (28) of shaft (26). In the art, the hub bearing generally consists of an oil seal abutting rest (24) that further adjoins the combination of an inner cone bearing, an inner cup bearing, an outer cup bearing and an outer cone bearing — with the bearing-combination interfacing with washer (40) of the present invention.

FIGS. 1, 2 and 4 best show the novel features of washer (40) of the present locking device. Washer (40) is provided with key (42) for meshing with keyway (30) of shaft (26). As a result of key (42), regardless of whether threads (28) have been fitted with counterclockwise or clockwise threading, the combination of key (42) and keyway (30) secures and prevents washer (40) from turning with or against the hub bearing (not shown) as the wheel (not shown) rolls. Washer (40) further includes threaded apertures (44) which have been positioned circumferentially about washer (40). And in this best mode disclosure, threaded apertures (44) are also positioned equidistantly apart from each other. FIGS. 1 and 2 show eighteen threaded apertures (44), but it has also been discovered that in another embodiment of this invention only six threaded apertures (44) are required for this locking device to be functional. When the present invention is utilized, posterior surface (46) of washer (40) will press against the outward surface of the hub bearing (not shown) thereby stabilizing the hub bearing and the wheel (not shown) supported by the hub bearing.

FIGS. 1, 3 and 5 best show the novel features of nut (50) of the present locking device. Nut (50) includes threads (52) for interfacing with threads (28) of shaft (26) and holes (54) for receiving bolts (80). Holes (54) are positioned circumferentially about nut (50) in such a manner that holes (54) are compatible with threaded apertures (44) of washer (40). And in this best mode description, holes (54) are also positioned equidistantly apart from each other. Although nut (50) is provided with six holes (54), only two bolts (80) are required for the present invention to be operational.

Bolt (80) is provided with threads (86) and oftentimes can also be supplied with recess (82) such as the type that is compatible with an Allen wrench. Recess (82) allows for greater precision in measuring pressure which has been applied to bolt (80) as it is torqued. However, bolt (80) can be provided with a grooved head (84) so that other tools may be used for torquing bolt (80). Additionally, it has been determined that the best operational mode of the present invention includes lock washers (88) for securing bolts (80).

As best shown in FIG. 1, raising from base (58) of nut (50) is hexagonal face (56) which is also provided with hollows (60) of greater diameter than grooved bolt head (84). Raised hexagonal face (58) assists the operator in torquing nut (50) along threads (28) of spindle (20) and against outer face (48) of washer (40) so that the operator can apply a preselected pressure to the hub bearing (not shown).

In accordance with the present invention, washer (40) and nut (50) and bolts (80) are made of stainless steel, but other alloys or hardened plastics can be utilized. Additionally, the diameter of the current locking device is about five inches, but any diameter for washer (40) and nut (50) which is larger than the diameter of shaft (26) can be operational. Still, in accordance with the present invention, the overall thickness of washer (40) and nut (50) is slightly greater than one inch, but an overall thickness of as little as about one-third of an inch can also function.

As best shown in FIG. 1, when using the present locking device, key (42) of washer (40) meshes with keyway (30) of shaft (26) and washer (40) is fitted to where posterior surface (46) of washer (40) abuts the hub bearing (not shown). Still in accordance with the present invention, base (58) of nut (50) presses against outer face (48) of washer (40) as threads (52) of nut (50) are torqued about threads (28) of shaft (26). It has been determined that nut (50) can be safely torqued with up to 125 foot pounds of pressure. While at least two bolts (80) are required to utilize the present locking device, it has been determined that each bolt can be safely torqued with up to 25 foot pounds of pressure, regardless of the number of bolts (80) selected for use. To those skilled in the art, it is easily seen how the combination of nut (50) and bolts (80) allow for greater precision in adjusting the force applied to the hub bearing (not shown), i.e., applying torque corresponding to the spindle-unit's (10) manufacturer's specifications.

To secure the present invention into its best operational mode, bolts (80) are first passed through lock washers (88) and thereafter through holes (54) of nut (50) to where threads (86) of bolts (80) interface with threaded apertures (44) of washer (40). As bolts (80) are torqued, nut (50) is drawn closer and closer to washer (40), thereby creating the locking device for the spindle-unit (10) capable of stabilizing the hub bearing (not shown) regardless of the direction in which the wheel (not shown) is rotating.

Having disclosed the invention as required by Title 35 of the U.S. Code, Applicant now prays respectfully that Letters Patent be granted for his invention in accordance with the scope of the claims appended hereto.

What is claimed is:

1. A locking device for holding a hub bearing on a spindle, the spindle having a keyway and threads formed thereon comprising:
   a) a washer having a key for aligning with said keyway of the spindle and further including threaded apertures positioned circumferentially about said washer for receiving a bolt; and
   b) a nut for interfacing with threads of the spindle and further including holes for aligning with said threaded apertures and for receiving a pair of bolts for fastening said washer and said nut.

2. The invention of claim 1 wherein said threaded apertures positioned circumferentially about said washer number six.

3. The invention of claim 1 wherein said threaded apertures positioned circumferentially about said washer number eighteen.

4. The invention of claim 2 wherein said holes for aligning with said threaded apertures number six.

5. The invention of claim 3 wherein said holes for aligning with said threaded apertures number six.

6. The invention of claim 5 wherein said threaded apertures are spaced equidistantly apart.

7. The invention of claim 6 wherein said holes are spaced equidistantly apart.

8. The invention of claim 7 further including more than two bolts.

9. The invention of claim 8 wherein said nut is provided with a raised hexagonal face.

10. A locking device for holding a hub bearing on a spindle, the spindle having a keyway and threads formed thereon comprising:
    a) a washer having a key for aligning with said keyway of the spindle and further including threaded apertures positioned circumferentially and equidistantly apart about said washer for receiving a bolt; and
    b) a nut for interfacing with threads of the spindle and further including six holes for aligning with said threaded apertures and for receiving bolts for fastening said washer and said nut.

11. The invention of claim 10 wherein said threaded apertures positioned circumferentially and equidistantly apart number six.

12. The invention of claim 10 wherein said threaded apertures positioned circumferentially and equidistantly apart number eighteen.

13. The invention of claim 12 wherein said holes are spaced equidistantly apart.

14. The invention of claim 13 wherein said nut is provided with a raised hexagonal face.

15. The invention of claim 14 further including six hollows in said raised hexagonal face of said nut for receiving up to six bolts.

16. A locking device for holding a hub bearing on a spindle, the spindle having a keyway and threads formed thereon comprising:
    a) a washer having a key for aligning with said keyway of the spindle and further including threaded apertures positioned circumferentially and equidistantly apart about said washer for receiving a bolt; and
    b) a hex-nut for interfacing with threads of the spindle having six holes spaced equidistantly apart for aligning with said threaded apertures for receiving bolts for fastening said washer and said hex-nut.

17. The invention of claim 16 wherein said threaded apertures positioned circumferentially and equidistantly apart number eighteen.

18. The invention of claim 16 further including six hollows in said hex-nut for receiving up to six bolts.

19. The invention of claim 17 further including six hollows in said hex-nut for receiving up to six bolts.

20. The invention of claim 19 wherein six bolts fasten said washer and said hex-nut.

* * * * *